United States Patent
Ryan, III

(10) Patent No.: US 9,946,990 B2
(45) Date of Patent: Apr. 17, 2018

(54) SYSTEM AND METHOD FOR DETERMINING PRODUCT MOVEMENT USING A SENSOR

(71) Applicant: Joseph Marsh Ryan, III, Longmont, CO (US)

(72) Inventor: Joseph Marsh Ryan, III, Longmont, CO (US)

(*) Notice: Subject to any disclaimer, the term of this patent is extended or adjusted under 35 U.S.C. 154(b) by 42 days.

(21) Appl. No.: 15/073,434

(22) Filed: Mar. 17, 2016

(65) Prior Publication Data

US 2016/0283899 A1  Sep. 29, 2016

Related U.S. Application Data

(60) Provisional application No. 62/137,906, filed on Mar. 25, 2015.

(51) Int. Cl.
*G06Q 10/08* (2012.01)
*G06K 7/10* (2006.01)

(52) U.S. Cl.
CPC .................. *G06Q 10/087* (2013.01)

(58) Field of Classification Search
CPC .............................. G06Q 10/087; G06F 3/044
USPC ........................................................ 340/5.92
See application file for complete search history.

(56) References Cited

U.S. PATENT DOCUMENTS

| | | | | |
|---|---|---|---|---|
| 5,920,287 A * | 7/1999 | Belcher | ................... | G01S 5/021 |
| | | | | 342/450 |
| 6,388,299 B1 * | 5/2002 | Kang | ................... | G01L 9/0073 |
| | | | | 257/415 |
| 6,813,896 B1 * | 11/2004 | Janke | ..................... | F25D 25/02 |
| | | | | 62/126 |
| 8,260,456 B2 | 9/2012 | Siegel | | |
| 8,676,377 B2 | 3/2014 | Siegel | | |
| 8,823,522 B2 | 9/2014 | Overhultz | | |
| 2002/0034067 A1 * | 3/2002 | Massaro | ............... | A47F 5/0068 |
| | | | | 361/728 |
| 2006/0017701 A1 * | 1/2006 | Marten | ................... | G06F 3/044 |
| | | | | 345/173 |
| 2006/0261941 A1 * | 11/2006 | Drake | ................. | G08B 13/149 |
| | | | | 340/539.26 |
| 2009/0248198 A1 * | 10/2009 | Siegel | ................... | G06Q 10/08 |
| | | | | 700/231 |
| 2015/0041616 A1 * | 2/2015 | Gentile | ................ | G06Q 10/087 |
| | | | | 248/550 |

* cited by examiner

*Primary Examiner* — Yong Hang Jiang
(74) *Attorney, Agent, or Firm* — James M. Smedley LLC; James Michael Smedley, Esq.

(57) ABSTRACT

The present invention is a system and method for determining product movement using a sensor. Through the interaction of items placed on an array of sensors connected to a circuit board controller, the apparatus is configured to detect a change in capacitance caused by the interaction and thereby associate it with an item or groups of items. Detection and association of such signals recorded in a database with items displaced in a storage location permits a user to keep track of said items remotely through a computing device.

16 Claims, 9 Drawing Sheets

SYSTEM AND METHOD FOR DETERMINING PRODUCT MOVEMENT USING A SENSOR

CROSS REFERENCE TO RELATED APPLICATION

This application claims the benefit of the following provisional application which is hereby incorporated by reference in its entirety: U.S. Provisional Patent Application No. 62/137,906 filed on Mar. 25, 2015 and entitled "SYSTEM AND METHOD FOR DETERMINING PRODUCT MOVEMENT USING A SENSOR."

FIELD OF THE INVENTION

The present invention generally relates to the field of inventory tracking and control. Specifically, embodiments of the present invention are directed towards an arrangement of sensor pads on a shelf or display rack that detect when an item is removed from the shelf or display rack.

BACKGROUND

Inventory monitoring and control are perennial concerns in retail, manufacturing, shipping, and various other settings. Operating businesses in these fields often entails the placement and removal of items on shelves and fixtures. In the retail sphere, among others, it is in many cases preferable to replenish the stock of certain items as soon as possible after their removal from their location of storage, display, or sale. In almost every instance, it is also desirable to be able to identify product loss, destruction or theft at the time of their occurrence or as close to it as possible.

In order to monitor the amount of and keep track of the placement of various items, conventional product inventory and security systems employ technology such as barcode scanners, radio frequency identification (RFID), electronic article surveillance (EAS), shelf weight scales, and closed circuit television networks. However, due to the inherent drawbacks of such systems, even when properly implemented, theft or loss of product is often not detected until long after the occurrence thereof, usually with such theft or loss not being registered until or even after the attempted extraction of the products from the premises. Furthermore, accurate monitoring of the stock or supply of products continues to demand physical inspection and perusal, as inventory levels or placement of items in storage, sale, or display areas continue to be inspected and verified by employees. This state of affairs allows for considerable product and revenue loss due to pilferage and inadequate product stocking to meet demand or customer interest.

For the foregoing reasons, there is a need for a system and method that can automatically track the location, presence, and/or absence of items in an inventory and electronically relay that information for convenient consumption by the user or operator of the system.

SUMMARY

The present invention is directed to an apparatus and method that satisfy the need for an automatic system for product movement and inventory tracking. The apparatus having features of the present invention comprises one or more electronic conductive sensor pads configured to detect changes in capacitance caused by the interaction of an item being placed on a sensor pad and a ground plane that it rests on. The invention further comprises a microcontroller that controls the operation of the apparatus, a frequency generator to provide variable electric frequencies for the sensor, and a power source. In some embodiments, the invention may comprise additional or alternate components that will become understood by one of skill in the art as suitable for implementing the system taught herein, in each case without departing from the spirit or scope of the invention.

Various arrangements of sensor pads are contemplated by the several embodiments of the present invention as they may be individually deployed, connected with one another in a linear fashion, or deployed as part of an interconnected array of such sensor pads. In a preferred embodiment, the sensor pads relay signals to the microcontroller circuit board which is configured to detect and record the unique signature of the aforementioned change in the electromagnetic field. Thereafter, the information is relayed to be stored in a database from which it can subsequently be retrieved.

The advantages of the present invention are that it provides immediate notification regarding the placement or removal of items thereon and allows for instantaneous feedback. In a preferred embodiment, the invention enables a user or operator of the invention to be much more quickly notified of the depletion of the stock of a product or of an unauthorized removal of an item placed on the sensor arrangement with a high degree of accuracy and reliability and without the need for repetitive physical verification by a person.

According to an embodiment of the present invention, the inventory tracking apparatus comprises sensor pads which comprise sensors and ground planes, wherein the sensor pads and the ground plane are configured to detect movement of an item via a change in sensor capacitance caused by the interaction between the sensor, the ground plane, and the item; a control communicatively connected to one or more sensor pads; and a database that receives data from the controller and is configured to generate a signal signature based in part on the change in the sensor capacitance.

According to an embodiment of the present invention, the sensor pads are substantially planar. In another embodiment of the present invention, the sensor pads comprise alternating layers of conductive and dielectric materials. In another embodiment of the present invention, the ground plane is a discrete component within each of the sensor pads. In another embodiment, the sensors and/or the ground planes comprise a conductive layer deposited onto a dielectric layer.

According to an embodiment of the present invention, the method of inventory tracking comprises the steps of detecting a capacitance change when an item is placed on a sensor pad; generating a signal signature based in part on the capacitance change; and tracking a movement of said item based in part on a change in said item location indicated by said signal signature.

According to an embodiment of the present invention, the method of inventory tracking comprises the step of associating said signal signature into a database as an item location for said item. According to another embodiment of the present invention, the method of inventory tracking repeats all of its constituent steps after a predetermined period of time.

According to an embodiment of the present invention, the method of inventory tracking comprises the step of displaying the said movement of said item to a user via a computing device. In another embodiment of the present invention, the method of inventory tracking comprises the steps are performed at least in part by an apparatus that comprises sensor pads which comprise sensors and ground planes, wherein the sensor pads and the ground plane are configured to detect movement of an item via a change in sensor capacitance caused by the interaction between the sensor, the ground plane, and the item; a controller communicatively connected to one or more sensor pads; and a database that receives data from the controller and is configured to generate a signal signature based in part on the change in the sensor capacitance.

The foregoing summary of the present invention with the preferred examples should not be construed to limit the scope of the invention. It should be understood by one skilled in the art that the examples of the invention thus described may be further modified without departing from the spirit and scope of the invention.

BRIEF DESCRIPTION OF THE DRAWINGS

These and other features, aspects, and advantages of the present invention will become better understood with reference to the following description and appended claims and accompanying drawings where:

DETAILED DESCRIPTION

Figure 1:
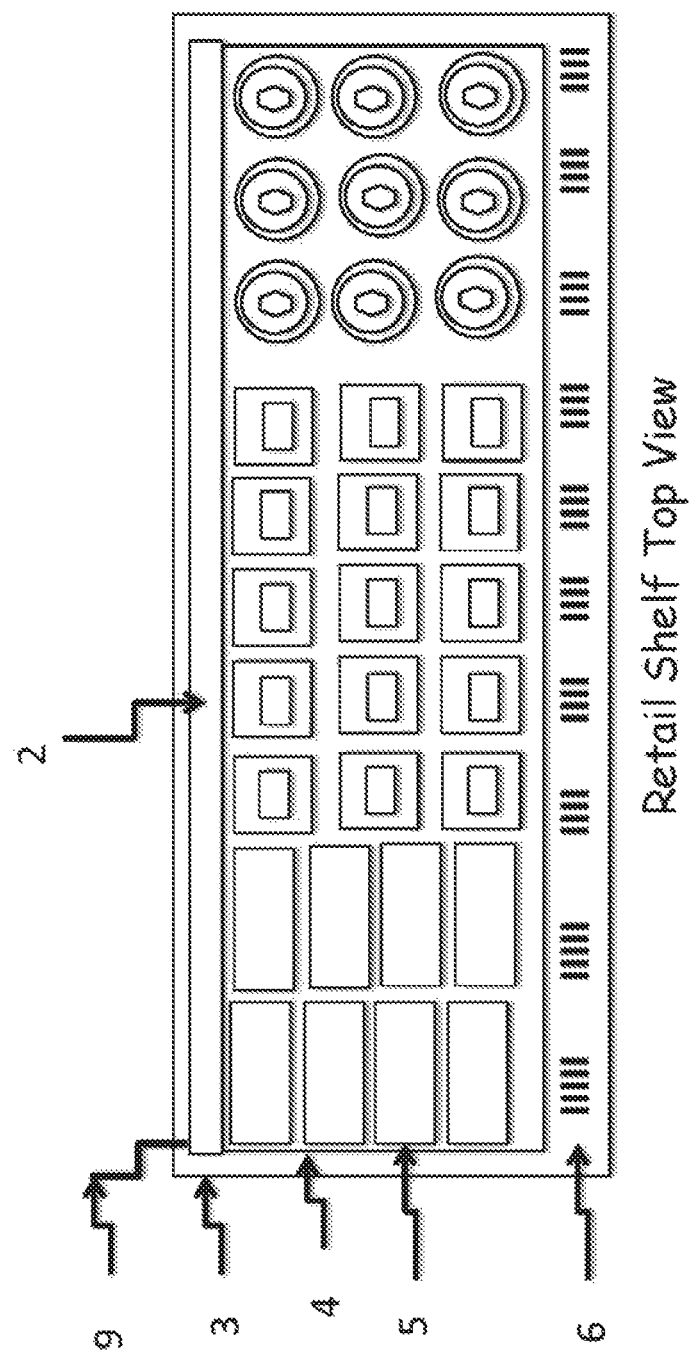
FIG. 1 is schematic diagram of an exemplary embodiment of the present invention illustrating a retail shelf depicting the location of products, different identifying markers respectively associated with a plurality of different products, and the exterior portions of the elements of the invention embodiment displaced thereon.

In the Summary above, the Detailed Description, the claims below, and in the accompanying drawings, reference is made to particular features (including method steps) of the present invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Whenever a reference herein is made to a method comprising two or more defined steps, the defined steps can be carried out in any order or simultaneously (except where the context excludes that possibility), and the method can include one or more other steps which are carried out before any of the defined steps, between two of the defined steps, or after all of the defined steps (except where context excludes that possibility).

According to an embodiment of the present invention, the system and method is accomplished through the use of one or more computing devices. One of ordinary skill in the art would appreciate that a computing device appropriate for use with embodiments of the present application may generally be comprised of one or more of a Central processing Unit (CPU), Random Access Memory (RAM), and a storage medium (e.g., hard disk drive, solid state drive, flash memory). Examples of computing devices usable with embodiments of the present invention include, but are not limited to, personal computers, smart phones, laptops, mobile computing devices, and servers. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be operated and implemented by a user of a computing device whether connected to a network or not. According to an embodiment of the present invention, some of the applications of the present invention may not be accessible when not connected to a network, however a user may be able to compose data offline that will be consumed by the system when the user is later connected to a network.

The preferred embodiment of the apparatus to which the present invention is directed primarily comprises one or more of each of a sensor pad, a ground plane, a sensor, a sensor pad controller, a shelf controller, and an externally accessible database. Generally, the system detects product placement or movement by sensing changes in capacitance of a sensor near a product. When an item is placed near a sensor, the relative permeability of the material in the product increases the capacitance of the sensor. Conversely, when a product is removed from the vicinity of a sensor, the sensor's capacitance decreases. Accordingly, in order to enable the aforementioned detection, the sensor pad is preferably made of a conductive material such as conductive ink, metal foil, or copper plating. As will be further described, the shape and arrangement of the sensor pads can be varied and depends on the typical arrangement of the items to be sensed. However, a preferred embodiment of the sensor array arrangement comprises a grid of rectangles placed under the items to be sensed.

According to an embodiment of the present invention, the ground plane is constructed of a grounded electrically conductive material similar to or the same as that of the sensors. In some embodiments of the invention, the ground plane may be a separate element positioned between a planar storage surface such as a shelf and the sensor pad. In some alternate embodiments of the invention, the ground plane may be displaced adjacent to the array of sensor pads and conductively connected thereto. In these exemplary embodiments, the ground plane may be composed of electrically conductive foils or of deposited or printed conductive material such as aluminum and copper among a variety of other suitable substances. In the preferred embodiment, both the sensor pad described above and the ground plane may be created using various conductive metal deposition or etching techniques that are well known in the art. In some embodiments, the ground plane may be made integral with the sensor pad by a fastening means or the aforementioned deposition or etching means. Alternatively, if a shelf or fixture itself is grounded and is composed of a suitably conductive material it may function as the ground plane of the apparatus in lieu of a separate additional element.

Whenever a single sensor or sensor pad is discussed herein, to the extent logically possible, any aspects, features, or embodiments thereof should be understood to be equally applicable to a plurality of sensors and sensor pads or any arrangement or array thereof, as applicable. Analogously, wherever a plurality or arrangement of sensors or sensor pads is discussed, the teaching herein should be deemed equally applicable, wherever logically possible, to a single sensor or sensor pad.

Referring now to the drawings wherein the illustrations are for the purposes of showing one or more exemplary embodiments, FIG. 1 depicts the top view of a retail shelf comprising a plurality of items 5 arranged on top of a pad 4 which extends over the surface of the shelf 3. In the preferred embodiment, the pad 4 is a continuous extension of and is connected to the housing 2, which contains the electronic components described below, and protects them from the external environment or unintended interaction from outside of the housing. Although the housing 2 can be separate from the pad 4, in a preferred embodiment the entirety of the continuous unit comprised of housing 2 and its sensor pad extension 4 are displaced together on a level surface of a shelf. As will be more clearly explained in the description relating to FIG. 2, the shelf 2, in an alternative embodiment, can be comprised of a conductive material that is grounded in order to serve as a ground plane for the pad 4. To facilitate the identification of the items 5 placed on the surface of the shelf 3, identifying marking such as barcodes 6 can be placed on the shelf 3 adjacent to the area where the items are to be placed. As can further be seen in the upper left corner of FIG. 1, a cable 9 serves to connect the elements arranged on the shelf to the remaining components of the system. Those skilled in the art will appreciate that the cable 9 can serve as a means for power transmittal and connection to a power source such as an electric outlet as well as a means communication between the constituent electronic parts of the system. Accordingly, the cable 9 can be a singular element of a type that incorporates both communication and power transmission, or be composed of separate wires each serving one of those respective functions and leading either to a power source or at least one other electronic component of the system.

Figure 2:
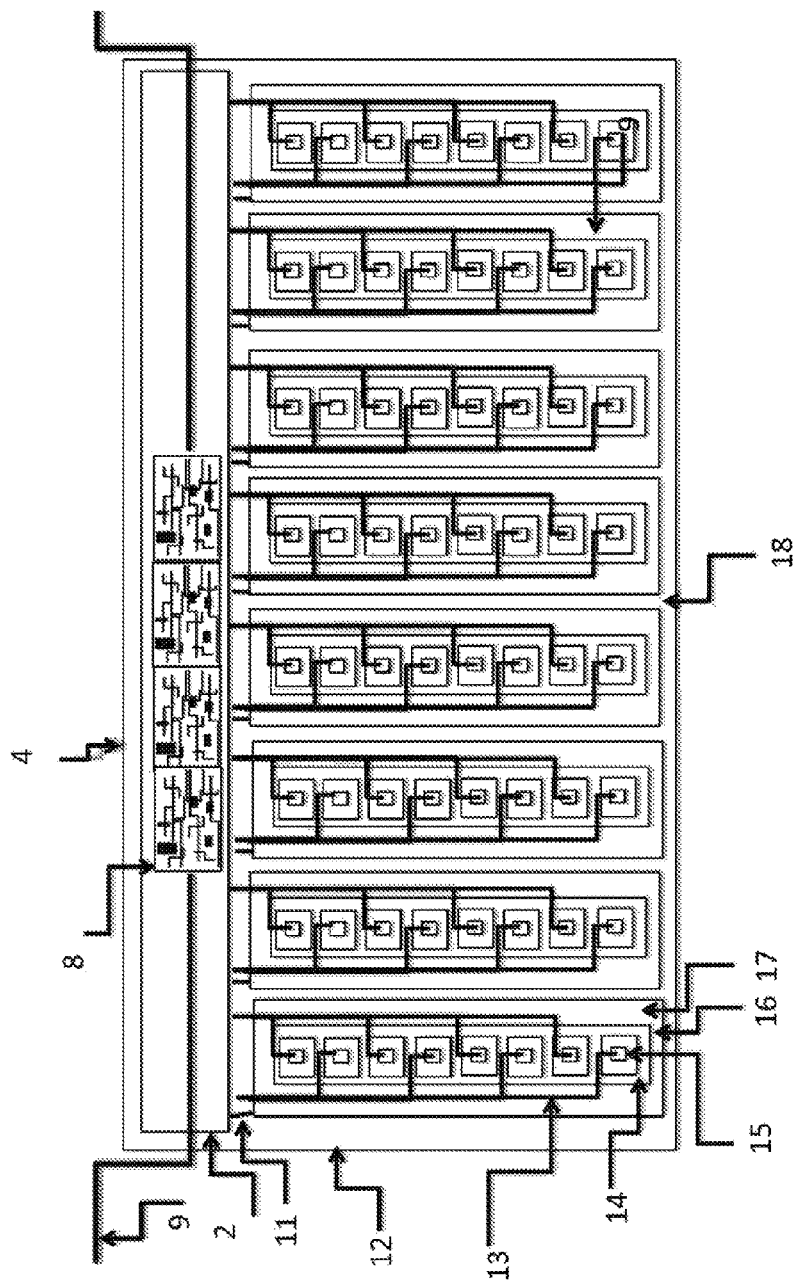
FIG. 2 is a schematic diagram of a cutaway top view of an exemplary embodiment of the present invention illustrating a shelf pad with a plurality of sensors arranged in an interconnected array in contact with a ground plane located adjacent to the array along with the location of a processor.

The pad 4, the interior of which can be better seen in FIG. 2, is preferably made of a plastic material and internally composed of several alternating layers of conductive and dielectric materials. In a preferred embodiment the sequential order of layers comprising the sensor pad 4 is as follows: (a) a bottom surface layer made of plastic; (b) a conductive grounding layer above it (comprising the ground plane), (c) a dielectric layer above the grounding layer, (d) a conductive sensor layer (comprising the sensor); and ending with (e) the topmost plastic cover layer which may be coextensive with the bottom surface layer. The size, shape, dimensions, and orientation of the pad as a whole along with that of the interior layers and the sensor portions of the pad in particular, can all be variable and governed by the shape of the shelf and the objects which are to be sensed.

Figure 4:
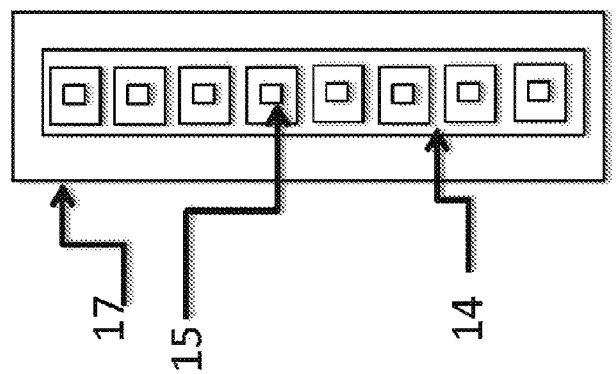
FIG. 4 is a schematic diagram depicting an alternate embodiment of the sensor pad's sensor array arrangement.

Accordingly, in some embodiments of the present invention, a single sensor pad 4 can be composed of only one sensor 15 that may be deployed independently. In other embodiments, however, a plurality of sensors 15 may be arranged in a linear sequence within a sensor pad 4 as seen in FIG. 4, or in an array, as shown in FIG. 2. The exemplary embodiment of a sensor pad illustrated in FIG. 2 depicts the internal components and connections in a cutaway view which were not visible in FIG. 1 due to the intervening surface layer of the pad 4. In this embodiment, the sensors 15 are arranged in a planar array of lines parallel to the shorter side of a rectangular shelf 3 analogous to the one shown in FIG. 1. The layers within the sensor pad 4 listed above are more clearly identified by their particular embodiments in FIG. 1 and are arranged in the following order from top to bottom: a sensor 15 displaced immediately below the top cover portion of the pad 4; a middle dielectric layer 14 below it; a ground plane 17; and the bottom cover portion 12 of the pad 4. The sensor 15 is a planar piece of conductive material the preferred embodiment of which is comprised of conductive foil although other shapes, thicknesses, and compositions are envisioned as well by the present invention. The sensor 15 is displaced on top of the dielectric layer 14 which is intended to separate and insulate it from the ground plane 17. The dielectric middle layer 14 can be made of any suitable material of low conductivity such as plastic that can function sufficiently as an insulator. The ground plane 17 is consequently displaced in very close proximity to the sensor 15 but is not at all electrically connected to it. The grounding plane which is depicted in the embodiment of in FIG. 2 as a discrete layer, can, aside from being made of foil, be also be made of a conductive material such as copper or aluminum fused, etched, deposited, or otherwise affixed to the bottom of the dielectric layer above it. The ground plane 17 serves to stabilize the readings from the sensors 15 and helps filter the noise from the signals transmitted therefrom.

Therefore, the size, shape, dimensions, and orientation of the layers described above can be varied and tailored to conform to the available space and the nature of items to be sensed. As long as the sensor 15 layer is separated by the dielectric layer 14 from the ground plane 17, each layer and consequently the entire pad 4 can be customized to fit the dimensions of the shelf or surface on which the pad 4 is to be placed, and to accommodate the types of items or products which one intends to place upon the sensor pad 4. In the alternative embodiment mentioned earlier, the shelf 3 itself can serve as a ground plane 17 as long as it is properly grounded and not electrically connected to anything that would interfere with the operation of the sensor.

In any embodiment, the grounded sensor array is electrically connected to a computing device such as the shelf pad controller 8. Multiple such shelf pad controllers 8 may be connected together via the cable 9 embodying various communication technologies such as RS-485 (Ethernet) or any other alternative known in the art suitable for such communication and power transmission. Accordingly, each sensor 15 is electrically connected to the shelf pad controller 8 via a wire 13 while the ground plane 14 is grounded via a trace wire 11. Each shelf pad controller 8 is contained within housing 2 the interior of which is hollow and coextensive with the space created between the top and bottom surface layers of pad 4. The sensors 15 connect, through the wire 13 via a flex cable multipronged connector (RS 485), to a corresponding port on the shelf pad controller 8.

Figure 3:
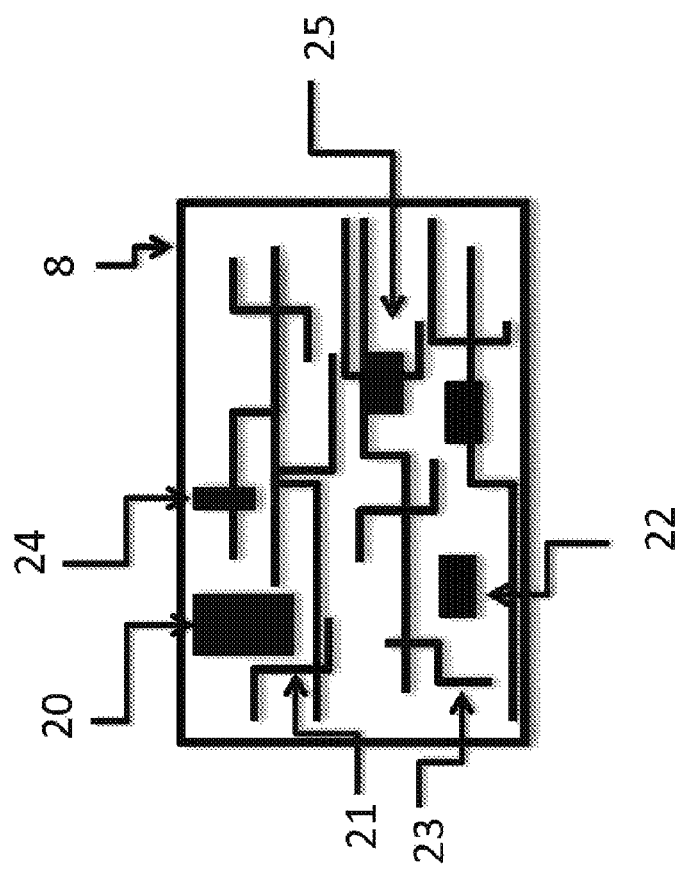
FIG. 3 is a schematic diagram depicting a detailed illustration of an exemplary shelf pad controller of a preferred embodiment of the present invention including integrated circuits, frequency generator, resistors, capacitors, shift registers, timing circuits, connectors, traces, and wiring.
Figure 5:
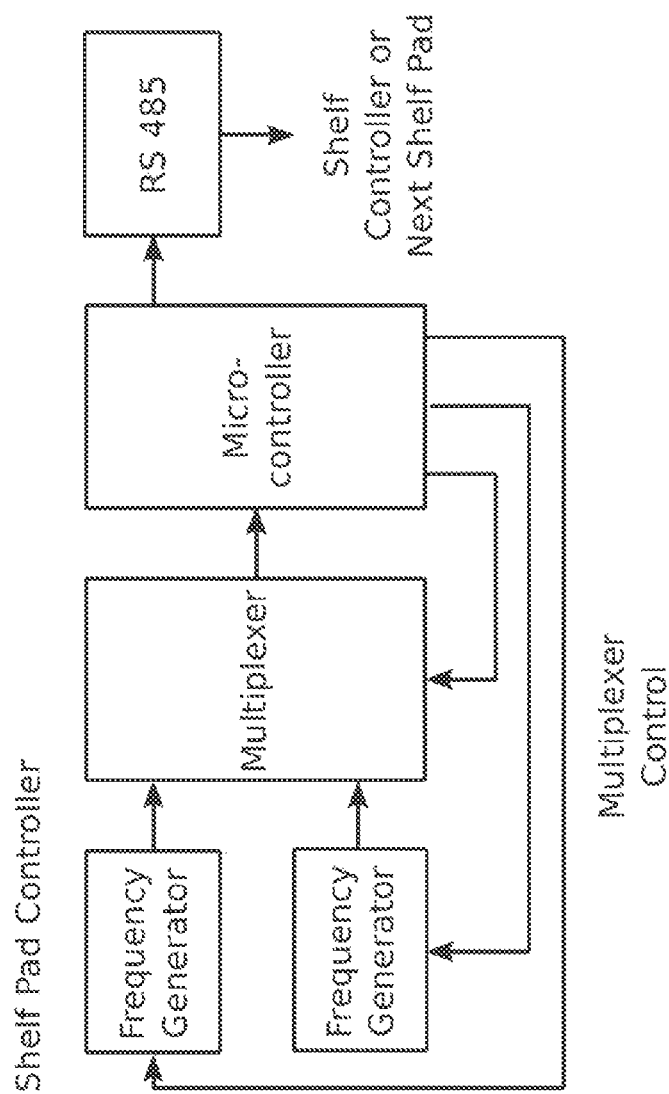
FIG. 5 is a block diagram of an exemplary embodiment of a frequency generator element in the present invention.
Figure 6:
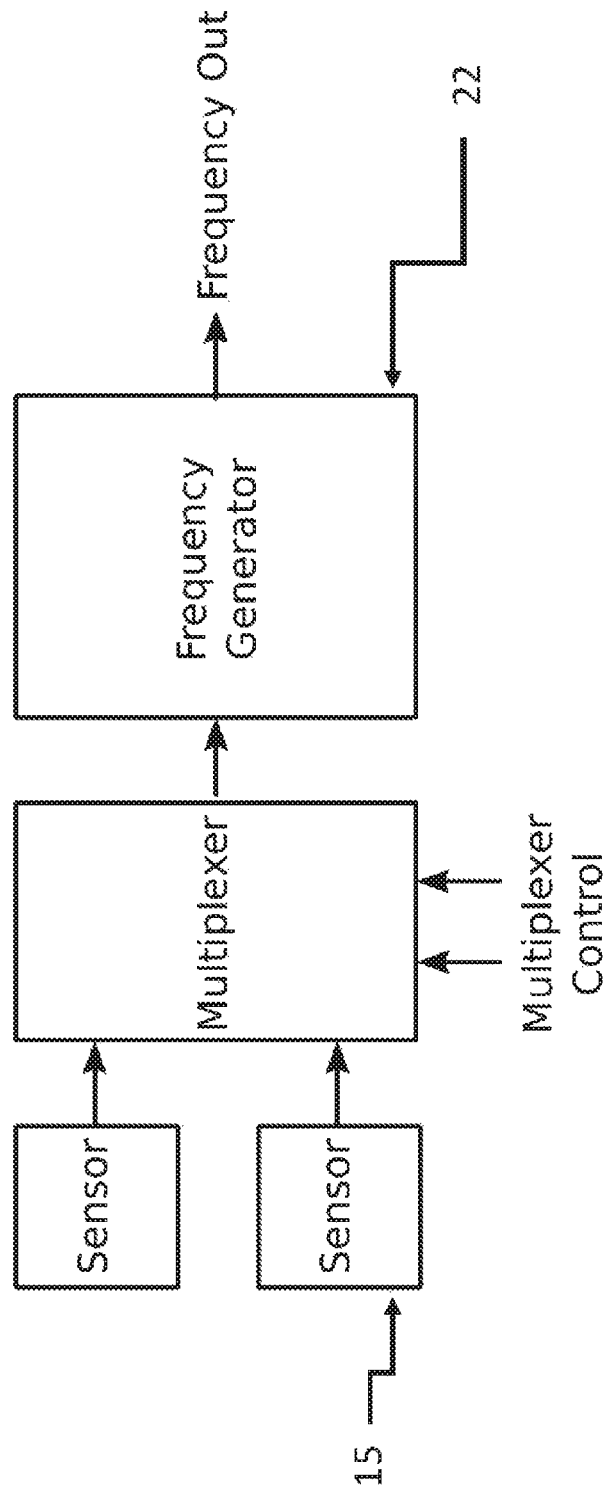
FIG. 6 is a block diagram depicting the elements of an exemplary embodiment of a sensor pad controller.
Figure 7:
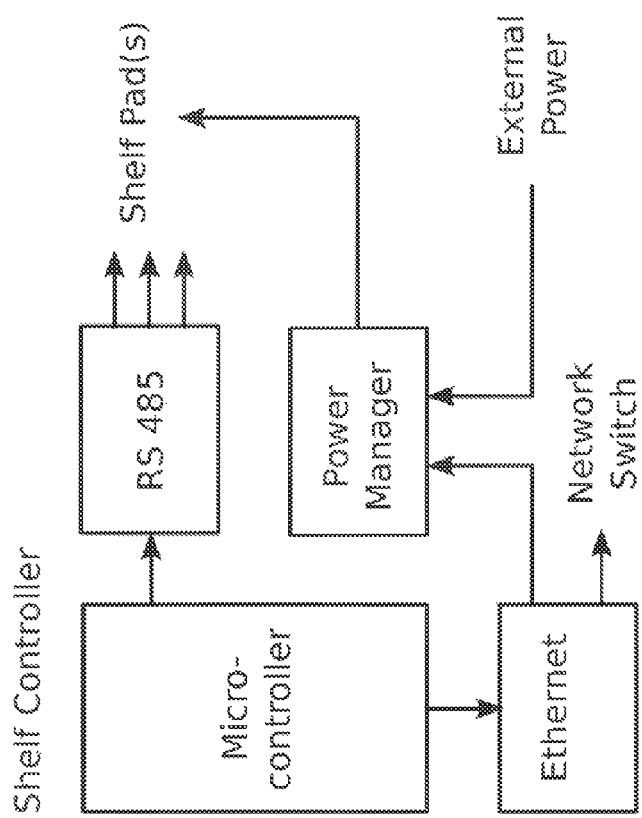
FIG. 7 is a block diagram of an exemplary embodiment of a shelf controller.

The preferred embodiment of the shelf pad controller 8 comprises a plurality of sub-components such as integrated circuits, resistors, capacitors, shift registers, timing circuits, traces, and wiring, as seen in FIG. 3, all of which are distributed within a Printed Circuit Board (PCB) substrate. A preferred embodiment of the shelf pad controller 8 further comprises a microcontroller 19, a frequency generator 22, a Category 5 (Cat. 5) (Ethernet) connector, and a plurality of traces 21 printed or deposited on the PCB board connecting the various elements displaced thereon. As can be seen in FIG. 6 and FIG. 5, the raw input signal from the sensors 15 is transmitted into the shelf pad controller 8 where a series of capacitors and resistors serve to filter out the noise of the raw signal and output a clearer resultant signal. The signal transfer is actualized by first by passing through a multiplexer, a frequency generator 22, and a microcontroller 19 before being passed on to the shelf controller 806. Since the system may comprise any plurality of such shelf pad controllers 8, they may be connected to each other in a daisy chain and further connected to a shelf controller 806 as represented in the block diagrams of FIGS. 7 and 8. The shelf controller 806 serves to aggregate the signals from all of the shelf pad controllers 8, manage the power feed, and transmit the collected data to a network switch which passes it on to the remainder of the system.

As items are placed, arranged, or moved on the surface of the sensor or interconnected sensor array a particular signal change signature identified by the change in the capacitance of the sensor 15 is detected and registered by the apparatus via the operation of the shelf pad controller 8 described above. This is made possible because the surface area of an item placed on a sensor 15 that is in contact therewith is directly proportional to its capacitance. Each item or arrangement of items may be associated with a capacitance change signature and the measurement of such changes can be recorded and stored in a database from which it can subsequently be retrieved.

Figure 8:
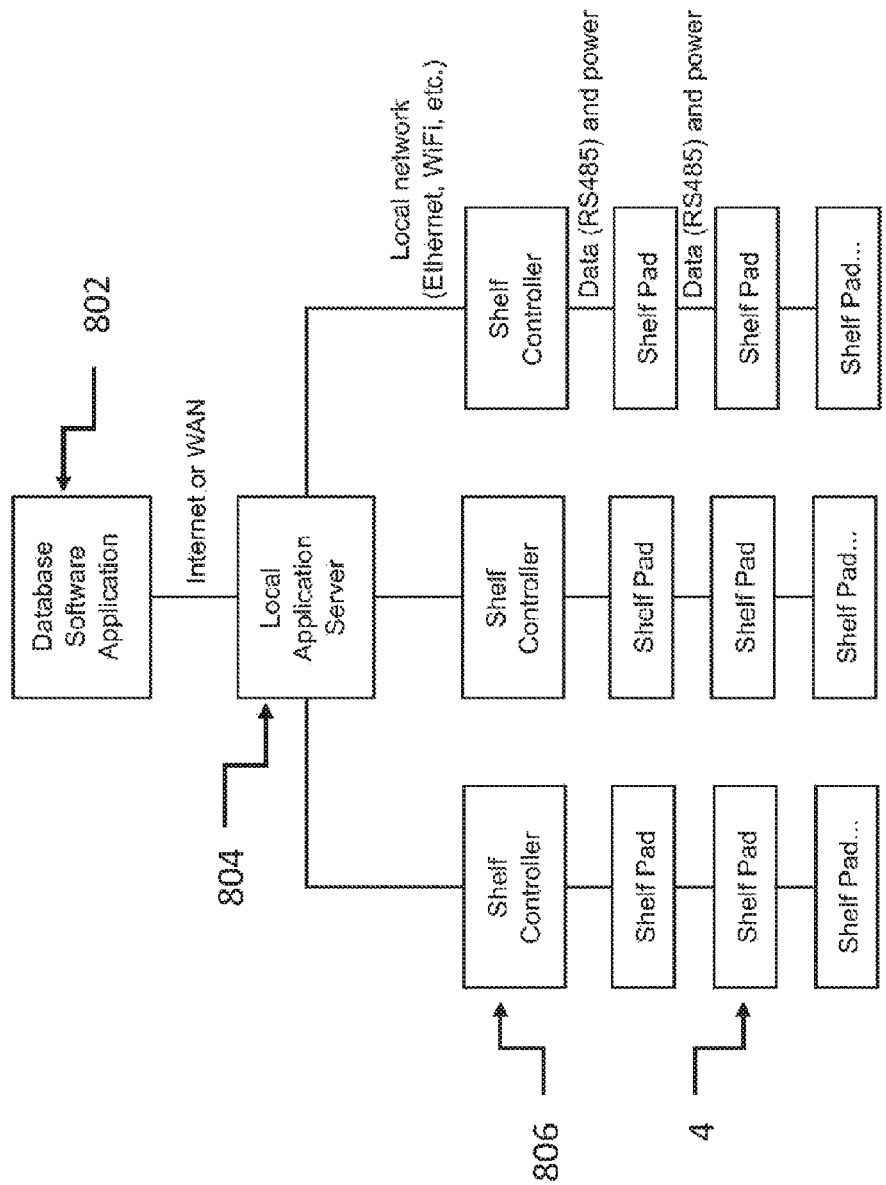
FIG. 8 is a block diagram illustrating a high-level overview of a preferred embodiment of the present invention.

According to a preferred embodiment of the present invention, the apparatus may further comprise software and an algorithm within said secure database which is configured to generate the unique signal signatures and to associate the inventory levels and item movement to particular authorized planograms (diagrammatic representations of product arrangement layouts) as well as to normalized sales and operational activities. This software can be run on a computer or server in the same facility as the sensors or it can be hosted off-site. In either case, a preferred embodiment of the invention has the sensors communicate with the software application through standard computer network technologies such as Ethernet or WiFi. A global overview of the system is depicted in FIG. 8 where a series of shelf pads 4, can be seen as connected to a plurality of shelf controllers 806, which are linked to a local application server that is then further connected to a database software application either via the internet or a WAN.

Figure 9:
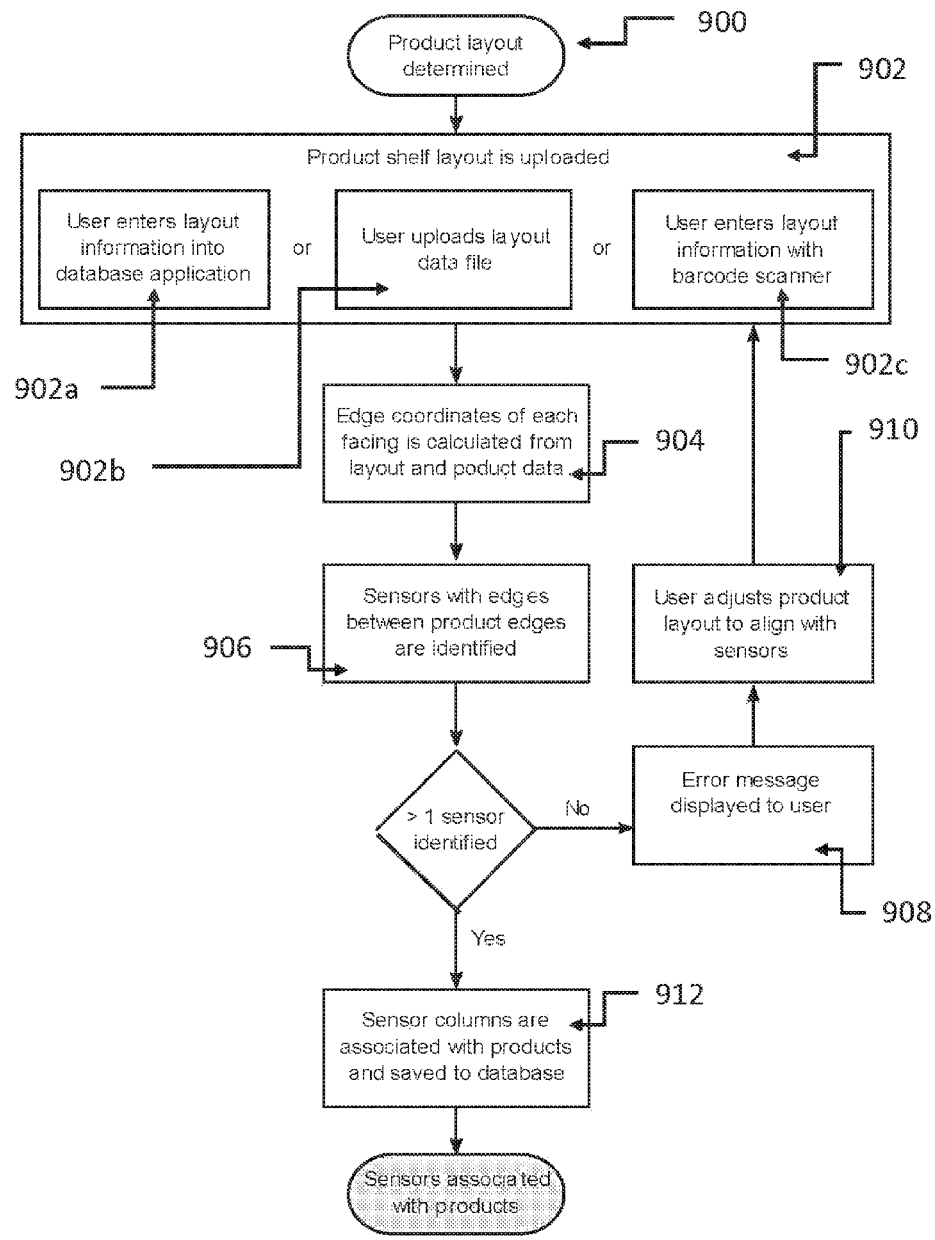
FIG. 9 is a flowchart showing an exemplary sensor and product association process.
Figure 10:
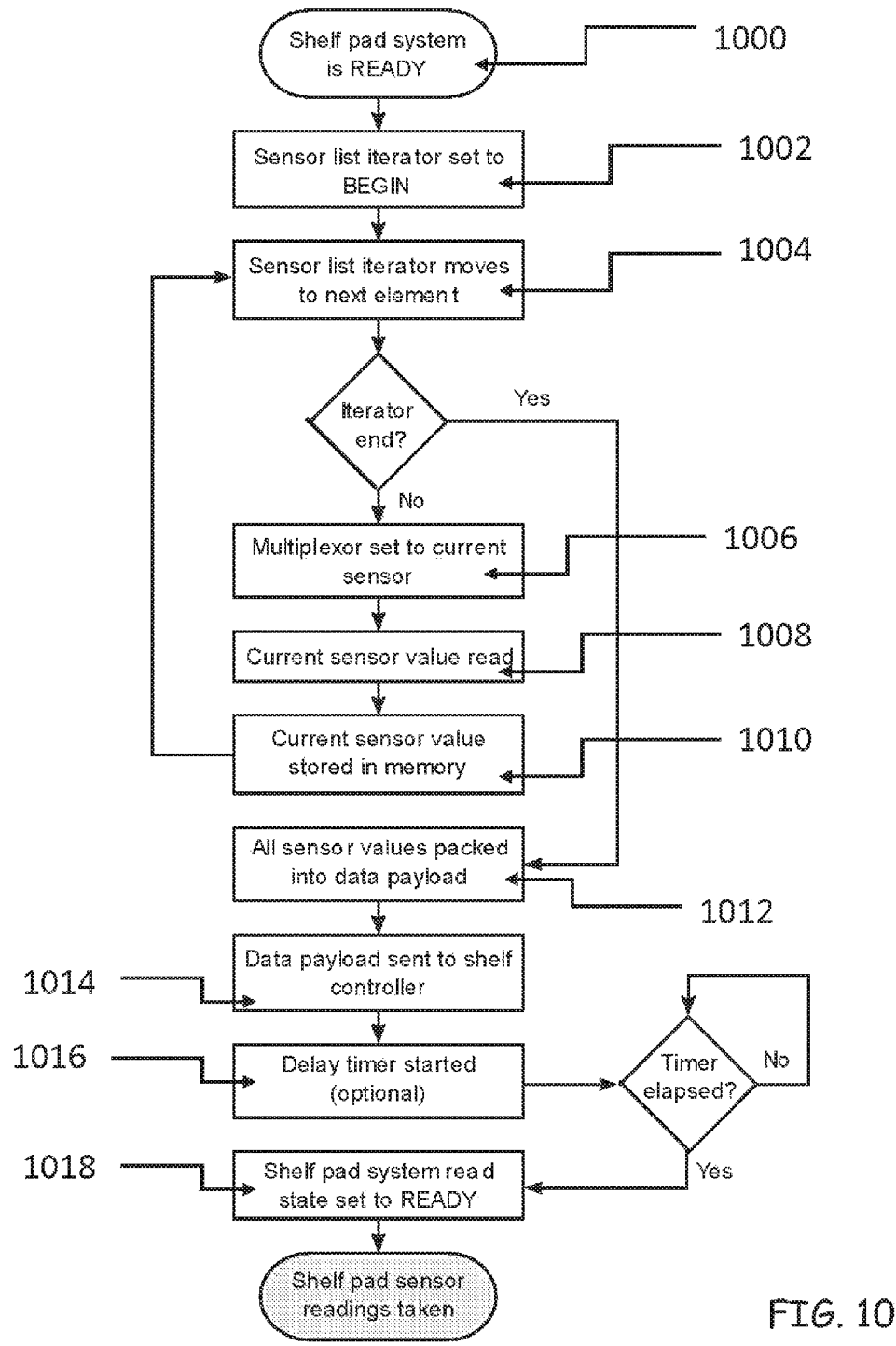
FIG. 10 is a flowchart showing an exemplary sensor reading process.

The present invention is further directed to a method for detecting product placement, absence, and movement. As shown by FIG. 9 and FIG. 10, the method primarily comprises steps of registration and signal association as well as the steps involved in the detection of the capacitance change signal. Users of the system can interact with the system via a cloud-based hosted database 802 to which users should first login and register. The step of registration further comprises the steps of accessing a logging website to input data; registering planogram product size and locations; listing the information of the authorized users; selecting reports; altering the signatures associated with product detection; altering other parameters of the sensing system including but not limited to that of data upload frequency, alarm thresholds, and alert trigger values; and downloading an application from a website. The signal association step further comprises the steps of importing a customer planogram into a database and assigning a pad configuration via an algorithm that determines which sensors should be associated with which product types by using the dimensions and layout of the products described in the planogram with the known dimensions and layout of the sensors. Alternatively, a user may manually associate a product type with specific sensors through a software interface. This manual association may be aided by scanning barcodes on products and position barcodes located on the shelf. IN a preferred embodiment, after products are associated with specific sensors, a calibration sequence is then performed to determine capacitance values specific to each product and determine the steady state of the signal associated with each sensor code location.

The preferred embodiment of the method of associating products and sensors described above is depicted by the flowchart of FIG. 9. Beginning with the first step 900 where a user decides how the user desires to place or present the items or products on the shelf incorporated into the system of the present invention. In the following uploading step 902, the desired layout can be uploaded in a variety of manners including but not limited to (a) manually entering the layout information for each product and sensor 15 into the database application 902a, (b) uploading a layout datafile such as a planogram 902b, and (c) entering the layout information by electronically scanning a barcode associated with a particular area on the layout. Subsequently in an aligning step 904, edge coordinates of each facing are calculated from the combination of the layout and product data. This permits the identification of sensors 15 the edges of which are located between product edges to be identified in the next step 906. If more than one sensor with edges that are between product edges are identified, then an error message is displayed to the user 908 prompting the user to take the step of adjusting the product layout 910 to align with the sensors. If only one or none of the sensors' 15 edges are identified as being between product edges, then sensor 15 columns are associated with the products and saved to the database in the terminating step 912.

The preferred embodiment of the process of taking a sensor 15 reading by the shelf pad controller 8 is as follows. Beginning with the shelf pad system in its initial "READY" state 1000, the sensor list iterator is set to "BEGIN" 1002. Then, the sensor list iterator moves to the next element in the list at step 1004. Thereafter if the iterator has reached the end of the list, the process continues to step 1012, but if the previous element was not the last element in the list, then the multiplexor is set to the current sensor at step 1006. Afterwards, the current sensor value is read in step 1008 and that value is subsequently stored 1010 in memory. The sensor list element may then again move 1004 to the next element in the list and repeat steps 1006 through 1010 until the last element in the list is reached at which point all the sensor values collected are packed in step 1012 into a data payload. The data payload is then 1014 sent from the shelf pad controller 8 to the shelf controller 806. After the data payload is sent to the shelf controller 806, the system may optionally initiate a delay timer 1016 which will pause the process for a predetermined period of time before returning the system to a "READY" state at step 1018.

Advantages and Uses

The benefits and advantages of the present invention are many as it can be used in a variety of settings and circumstances. For example, the apparatus may be employed to alert law enforcement about the occurrence of thefts or pilferage in real time via a convenient and un-intrusive mobile application. Through a computer device configured to receive information from the database, law enforcement personnel would be capable of observing a visual indication of a potential criminal occurrence. In the retail context, the apparatus can serve to provide reports of the levels of stock of various items to enable authorized users to determine potential trending activities concerning particular areas or items. This present invention may be especially advantageous to detect patterns of activities that can be linked to theft or similar crime and can facilitate the expedient apprehension of shoplifters.

Other advantages of the present invention include the ability to provide automatic updates to third parties such as direct store delivery companies to notify such entities that the inventory of their products is running low or that the products are out of stock. In a similar manner, the invention can provide consolidated reports concerning the status of product or item inventory to the leadership, security, and merchandise personnel of the enterprise employing the apparatus.

Additional practical benefits and advantages of the present system include the absence of moving parts susceptible to deterioration due to use and wear-and-tear, thereby making the system more durable and long-lasting than it would have otherwise been. This also entails the reduced need for repair and ensures a low cost of repair and maintenance of the system.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may have been omitted so as to not unnecessarily obscure the embodiments.

While multiple examples are disclosed, still other examples of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. An inventory tracking apparatus comprising:
   one or more sensor pads which comprise one or more sensors, wherein said sensor pads are configured to detect each of a presence, absence, and movement of an item via a change in sensor capacitance caused by an interaction between said sensor and said item;
   a controller communicatively connected to said one or more sensor pads via a pathway that passes through a multiplexer and an electrical frequency generator;
   a database that receives data from said controller and is configured to generate a signal signature based in part on said change in sensor capacitance;
   wherein said one or more sensor pads comprise a plurality of pairs of alternating layers of conductive and dielectric materials; and
   said controller comprises said electrical frequency generator.

2. The inventory tracking apparatus of claim 1, further comprising at least one ground plane.

3. The inventory tracking apparatus of claim 2, wherein said at least one ground plane is a discrete component within each of said sensor pads.

4. The inventory tracking apparatus of claim 2, wherein said at least one ground plane is a shelf.

5. The inventory tracking apparatus of claim 2, wherein at least one of said sensors or said ground planes comprises a conductive layer deposited onto a dielectric layer.

6. The inventory tracking apparatus of claim 1, wherein said one or more sensor pads are substantially planar.

7. The inventory tracking apparatus of claim 1, wherein said controller is configured to be communicably coupled with additional controllers.

8. The inventory tracking apparatus of claim 1, wherein said controller is configured to be communicably coupled with a computer network.

9. The inventory tracking apparatus of claim 1, further comprising a plurality of connectors for power transmission.

10. The inventory tracking apparatus of claim 1, further comprising a plurality of connectors for data transmission.

11. The inventory tracking apparatus of claim 1, further comprising an application server communicably connected to said one or more sensor pads.

12. A method of inventory tracking comprising the steps of:
   detecting a capacitance change every time when an item is removed from, placed on, and moved on a sensor pad;
   generating a signal signature representative of and based at least in part on said capacitance change;
   tracking a movement of said item based in part on a change in said item location indicated by said signal signature;
   wherein the steps are performed at least in part by an apparatus comprising:
   one or more sensor pads which comprise one or more sensors, one or more ground planes, wherein said sensor pads and said ground plane are configured to detect
   movement of an item via a change in sensor capacitance caused by an interaction between said sensor, said ground plane, and said item;
   a controller communicatively connected to said one or more sensor pads;
   a database that receives data from controller and is configured to generate a signal signature based in part on said change in said sensor capacitance;
   wherein said one or more sensor pads comprise a plurality of pairs of alternating layers of conductive and dielectric materials; and
   said controller comprises said electrical frequency generator.

13. The method of claim 12 further comprising a step of associating said signal signature into a database as an item location for said item.

14. The method of claim 12 wherein all of the steps are repeated after a predetermined period of time.

15. The method of claim 12 further comprising a step of displaying each of said removal, placement, and movement of said item to a user via a computing device.

16. An inventory tracking apparatus comprising
one or more sensor pads which comprise one or more sensors, one or more ground planes, wherein said sensor pads and said ground plane are configured to detect movement of an item via a change in sensor capacitance caused by an interaction between said sensor, said ground plane, and said item;
a controller communicatively connected to said one or more sensor pads; and
a database that receives data from controller and is configured to generate a signal signature based in part on said change in said sensor capacitance;
wherein said one or more sensor pads comprise a plurality of pairs of alternating layers of conductive and dielectric materials;
said controller comprises said electrical frequency generator; and
a non-transitory, computer readable recording medium containing a computer program, which when executed by a processor, causes the processor to perform the steps of:
detecting a capacitance change every time when an item is removed from, placed on, and moved on a sensor pad;
generating a signal signature representative of and based at least in part on said capacitance change;
and tracking a movement of said item based in part on a change in said item location indicated by said signal signature.

* * * * *